(12) United States Patent
Sengoku et al.

(10) Patent No.: US 7,531,968 B2
(45) Date of Patent: May 12, 2009

(54) INVERTER CIRCUIT, BACKLIGHT AND LIQUID CRYSTAL DISPLAY

(75) Inventors: Osamu Sengoku, Tokyo (JP); Takashi Kinoshita, Tokyo (JP); Tatsuhisa Shimura, Tokyo (JP)

(73) Assignee: Samsung Electronics Co., Ltd. (KR)

( * ) Notice: Subject to any disclaimer, the term of this patent is extended or adjusted under 35 U.S.C. 154(b) by 178 days.

(21) Appl. No.: 11/501,415

(22) Filed: Aug. 9, 2006

(65) Prior Publication Data

US 2007/0108917 A1   May 17, 2007

(30) Foreign Application Priority Data

Nov. 17, 2005   (KR) .................. 10-2005-0109993

(51) Int. Cl.
*H05B 41/24* (2006.01)
(52) U.S. Cl. .................... 315/277; 315/282; 315/312; 345/102
(58) Field of Classification Search ......... 315/276–278, 315/274, 282, 312, 291, DIG. 2, 224, 119; 345/102, 87, 84, 55, 30; 349/70, 61, 56
See application file for complete search history.

(56) References Cited

U.S. PATENT DOCUMENTS

| | | | | |
|---|---|---|---|---|
| 7,119,495 | B2 * | 10/2006 | Jang | ........................... 315/244 |
| 7,294,971 | B2 * | 11/2007 | Jin | .............................. 315/177 |
| 7,309,964 | B2 * | 12/2007 | Wey et al. | ................... 315/312 |
| 2004/0257003 | A1 * | 12/2004 | Hsieh et al. | ................ 315/246 |
| 2005/0253537 | A1 * | 11/2005 | Jang et al. | ................... 315/307 |
| 2006/0290453 | A1 * | 12/2006 | Park et al. | ..................... 336/69 |

FOREIGN PATENT DOCUMENTS

| | | |
|---|---|---|
| JP | 2002-175891 | 6/2002 |
| JP | 2002343591 | 11/2002 |
| JP | 2004-227864 | 8/2004 |
| KR | 1020050045830 | 5/2005 |

* cited by examiner

*Primary Examiner*—Douglas W Owens
*Assistant Examiner*—Ephrem Alemu
(74) *Attorney, Agent, or Firm*—Cantor Colburn LLP

(57) ABSTRACT

An inverter circuit includes an inverter transformer to supply AC high voltages of opposite phases, and a plurality of balance transformers. The inverter transformer supplies AC high voltages of same phases to every n number of CCFLs, and the CCFLs are connected in series to primary windings of the balance transformers at every two CCFLs. Also, secondary windings of the balance transformers are connected in series to form a closed loop. Thus, an inverter circuit may realized for a large-sized backlight without increasing a number of the balance transformers.

20 Claims, 9 Drawing Sheets

INVERTER CIRCUIT, BACKLIGHT AND LIQUID CRYSTAL DISPLAY

This application claims priority to Korean Patent Application No. 2005-109993, filed on Nov. 17, 2005, and all the benefits accruing therefrom under 35 U.S.C. §119, the contents of which in its entirety are herein incorporated by reference.

BACKGROUND OF THE INVENTION

1. Field of the Invention

The present invention relates to an inverter circuit, and more particularly, to an inverter circuit for a backlight of a liquid crystal display ("LCD").

2. Description of the Related Art

Generally, LCDs have low driving voltage and low power consumption and are lightweight and slim. Because of these advantages, LCDs are widely used as display devices in personal computer ("PC") monitors, television ("TV") monitors, and so on. Recently, there is an increasing demand for large-sized LCDs.

The LCD includes a backlight and a liquid crystal display unit disposed in front of the backlight. The backlight supplies light to a liquid crystal panel, and the liquid crystal display unit displays an image by using the light supplied from the backlight.

The backlight includes a reflection plate, a light source, and an optical sheet. When a current is applied to the light source, the light source supplies the light to the display unit.

A cold cathode fluorescent lamp ("CCFL") has been used as the backlight of the LCD. The CCFL has two terminals and emits light when high alternating-current ("AC") voltages are applied to the two terminals. As being one of many home appliances used, the LCD is supplied with an external AC of 110-120 volts. The LCD transforms the external AC voltage into a direct-current ("DC") voltage and pulse-drives a primary side of an inverter transformer using the DC voltage. Also, the LCD drives a CCFL using an AC voltage boosted at a secondary side of the inverter transformer. An inverter circuit is used to pulse-drive the primary side of the inverter transformer.

In the backlight of the LCD, a single inverter transformer turns on a single CCFL. As a screen size of the LCD becomes larger, a high voltage from the inverter transformer is applied to a plurality of CCFLs connected in parallel.

FIG. 9 is a schematic circuit diagram of a conventional inverter circuit for a plurality of CCFLs connected in parallel by applying a high voltage from an inverter transformer. Reference numerals 1000, 1001 and 1002-1 to 1002-$n$ represent an inverter transformer, a resistor and CCFLs, respectively. An AC voltage boosted at a secondary side of the inverter transformer 1000 is applied to the CCFLs 1002-1 to 1002-$n$. The resistor 1001 is a resistor that detects a current flowing through the CCFLs 1002-1 to 1002-$n$. A reference numeral 1004 represents a balance circuit that has balance transformers 1003-1 to 1003-$n$. The balance circuit 1004 is connected in series to the CCFLs 1002-1 to 1002-$n$.

The primary sides of the balance transformers 1003-1 to 1003-$n$ are connected in series between the CCFLs 1002-1 to 1002-$n$ and a ground GND, respectively. The secondary sides of the balance transformers 1003-1 to 1003-$n$ form a closed loop. Therefore, a current is flowing through the closed loop commonly flows through the secondary sides of the balance transformers 1003-1 to 1003-$n$. Currents iL1, iL2, . . . iLn flowing through the respective CCFLs 1002-1 to 1002-$n$ connected to the primary sides of the balance transformers 1003-1 to 1003-$n$ maintain the balance.

However, the conventional inverter circuit of FIG. 9 requires as many balance transformers as there are CCFLs. To meet the demand for the large-sized backlight for use in the large-sized LCD, the number of the CCFLs has to correspondingly increase. However, the increase in the number of the CCFLs causing the corresponding increase in the number of the balance transformers increases the manufacturing cost. Further, to make the large-sized backlight, a balance circuit board for the balance circuit also has to be large-sized, thus increasing the manufacturing cost.

BRIEF SUMMARY OF THE INVENTION

One aspect of the present invention is to provide an inverter circuit that can be realized for a large-sized backlight without increasing a number of balance transformers in a balance circuit, as well as to provide a backlight having the above inverter circuit and a liquid crystal display having the above backlight.

In an exemplary embodiment of the present invention, an inverter circuit includes an inverter transformer supplying AC high voltages of opposite phases and a plurality of balance transformers. The inverter transformer supplies AC high voltages of same phases to every n number of CCFLs. The CCFLs are connected in series to primary windings of the balance transformers at every two CCFLs and secondary windings of the balance transformers are connected in series to form a closed loop.

The inverter transformer supplies the AC high voltage of the same phases to every two CCFLs. The number of the inverter transformers may be two. The inverter transformer may have a single primary winding and two secondary windings, and the two secondary windings are arranged to have the AC high voltages of the opposite phase.

In another exemplary embodiment of the present invention, a backlight includes a plurality of CCFLs, an inverter transformer supplying AC high voltages of opposite phases to one another, and a plurality of balance transformer. The inverter transformer supplies AC high voltages of same phases to every n number of the CCFLs. The CCFLs are connected in series to primary windings of the balance transformers at every two CCFLs, and secondary windings of the balance transformers are connected in series to form a closed loop.

The inverter transformer supplies the AC high voltage of the same phases to every two CCFLs. The number of the inverter transformers may be two.

The inverter transformer may have a single primary winding and two secondary windings, and the two secondary windings are arranged to have the AC high voltages of the opposite phase. Terminals supplying the AC high voltages of the opposite phases to every n number of the CCFLs are spaced apart from each other by a slit.

In yet another exemplary embodiment of the present invention, a liquid crystal display includes a display unit, a backlight, a case and a top chassis. The display unit has a liquid crystal panel, and a data circuit and a gate circuit connected to the liquid crystal panel. The backlight has a plurality of CCFLs, an inverter transformer and a plurality of balance transformers. The case and the top chassis accommodate the display unit and the backlight, The inverter transformer supplies AC high voltages of same phases to every n number of the CCFLs. The CCFLs are connected in series to primary windings of the balance transformers at every two CCFLs, and secondary windings of the balance transformers are connected in series to form a closed loop.

The inverter transformer supplies the AC high voltage of the same phases to every two CCFLs. The number of the inverter transformers may be two.

The inverter transformer may have a single primary winding and two secondary windings, and the two secondary windings are arranged to have the AC high voltages of the opposite phase. Terminals supplying the AC high voltages of the opposite phases to every n number of the CCFLs are spaced apart from each other by a slit.

The liquid crystal display may be used as a liquid crystal monitor. Also, the liquid crystal display may be used in a liquid crystal television.

According to the present invention, although the number of the CCFLs increases, the number of the balance transformers can be reduced by half the number of the CCFLs, thereby realizing a large-sized backlight.

BRIEF DESCRIPTION OF THE DRAWINGS

The above and other aspects, advantages and features of the present invention will become readily apparent by reference to the following description of exemplary embodiments when considered in conjunction with the accompanying drawings wherein.

DETAILED DESCRIPTION OF THE INVENTION

Figure 1:
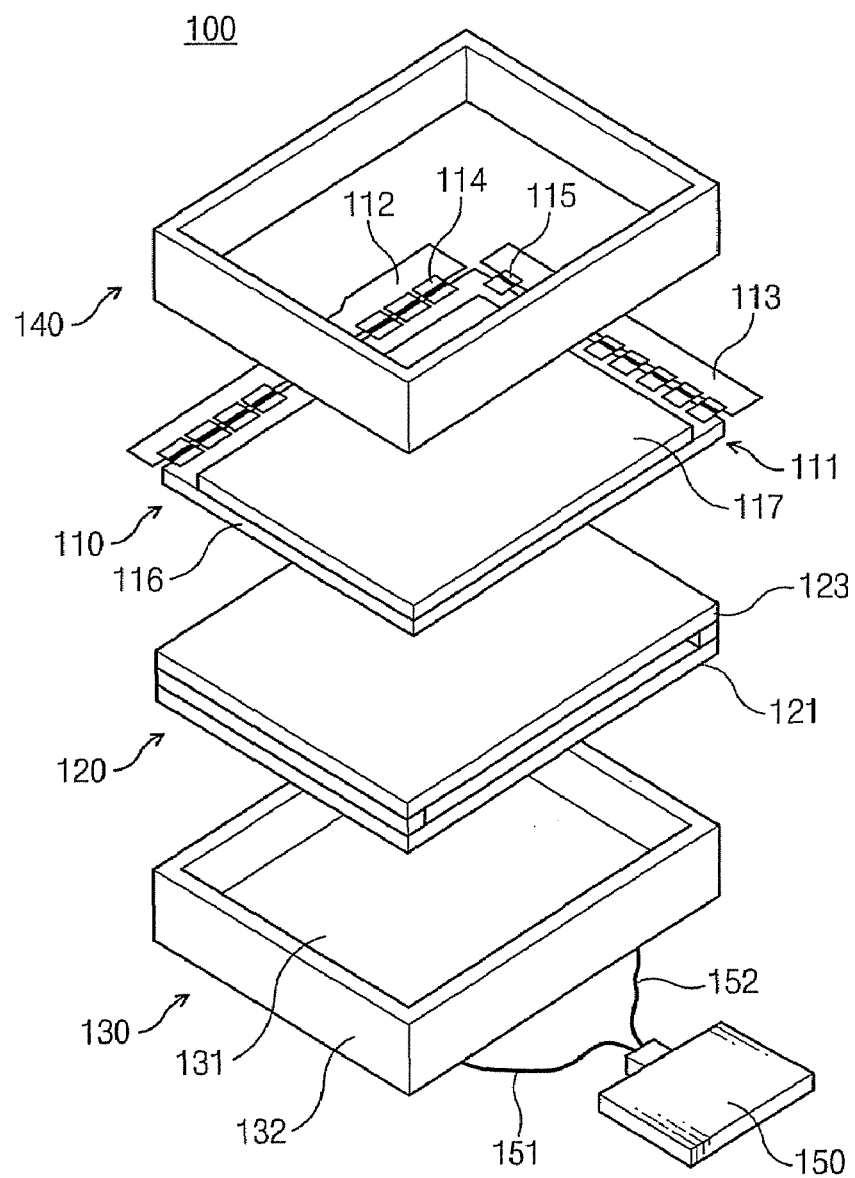
FIG. 1 is an exploded perspective view of an LCD having an inverter circuit and a backlight according to an exemplary embodiment of the present invention.

Reference will now be made in detail to the exemplary embodiments of the present invention, examples of which are illustrated in the accompanying drawings. However, the present invention is not limited to the exemplary embodiments illustrated hereinafter, and the exemplary embodiments herein are rather introduced to provide easy and complete understanding of the scope and spirit of the present invention. Therefore, the present invention should not be construed as being limited to the exemplary embodiments set forth herein. In the drawings, the thicknesses of layers and regions are exaggerated for clarity. Like reference numerals in the drawings denote like elements.

The terminology used herein is for the purpose of describing particular exemplary embodiments only and is not intended to be limiting of the present invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exploded perspective view of an LCD 100 having an inverter circuit and a backlight according to an exemplary embodiment of the present invention.

Referring to FIG. 1, the LCD 100 includes a display unit 110, a backlight unit 120, a case 130, and a top chassis 140.

The display unit 110 includes a liquid crystal display panel 111, and a data circuit 112 and a gate circuit 113 that generate driving signals for the liquid crystal display panel 111. The data circuit 112 and the gate circuit 113 are electrically connected to the liquid crystal display panel 111 through a tape substrate 114 for the gate circuit 113 and a tape substrate 115 for the data circuit 112, respectively.

The liquid crystal display panel 111 includes a thin film transistor ("TFT") substrate 116, a color filter ("CF") substrate 117 and a liquid crystal layer (not shown). The CF substrate 117 is disposed to face the TFT substrate 116. The liquid crystal layer is interposed between the TFT substrate 116 and the CF substrate 117.

There is no special limitation for the material used for the TFT substrate 116, as long as TFTs and electrodes can be formed thereon. As an example, a transparent glass substrate can be suitably used for the TFT substrate 116.

The TFT substrate 116 includes a plurality of gate electrodes, a plurality of data electrodes, a plurality of TFTs and a plurality of pixel electrodes. The data electrodes intersect with the gate electrodes. The TFTs are arranged around the intersecting points of the gate electrodes and the data electrodes and are connected thereto. Also, the pixel electrodes are connected to the respective TFTs. Moreover, common electrodes are arranged to correspond to the pixel electrodes. The common electrodes may be formed on the TFT substrate 116 or the CF substrate 117.

Like the TFT substrate 116, there is no special limitation for the material for the CF substrate 117, as long as CFs can be formed thereon. As an example, a transparent glass substrate can be suitably used for the CF substrate 117. The CFs may be formed by arranging organic layers, including red (R), green (G) and blue (B) coloring materials, at positions corresponding to the respective pixel electrodes of the TFT substrate 116. In the LCD 100, the backlight unit 120 is installed in rear of the display unit 110 and an image is displayed by controlling the light emitted from the backlight unit 120 by using optical variations occurring in the liquid crystal display panel 111. Therefore, in the present exemplary embodiment, the TFT substrate 116 and the CF substrate 117 may be a transparent substrate.

The case 130 has a bottom plate 131 and sidewalls 132 disposed at edges of the bottom plate 131. The case 130 accommodates the display unit 110 and the backlight unit 120. That is, in combination with the top chassis 140, the case 130 holds the display unit 110 and so on, and also protects the display unit 110 from external impacts.

Figure 2:
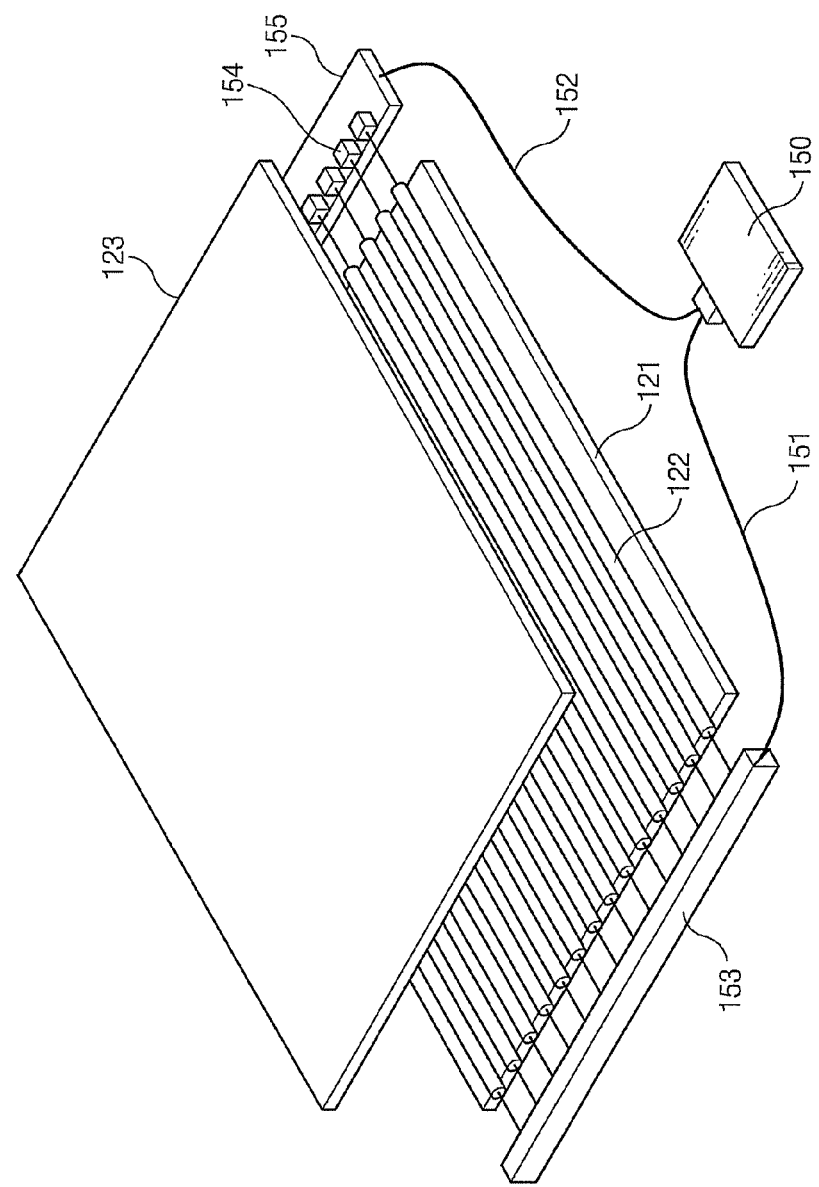
FIG. 2 is an exploded perspective view of a backlight unit in the LCD of FIG. 1.

FIG. 2 is an exploded perspective view of the backlight unit 120 in the LCD 100 of FIG. 1.

Referring to FIG. 2, the backlight unit 120 includes a reflection plate 121, a plurality of lamps 122 arranged in parallel on the reflection plate 121, an optical sheet 123 disposed on the lamps 122, a first electrode 153 connected to the lamps 122 at one end, and a plurality of second electrodes 154 connected to the lamps 122 at an opposite end. Also, the second electrodes 154 are formed on an electrode substrate 155. A balance circuit that will be described later is formed on the electrode substrate 155. A CCFL may be used as the lamp 122 for each of the lamps 122. However, the present invention is not limited to the CCFL. Hereinafter, it is assumed that the CCFL is used as the lamps 122.

The inverter circuit 150 is connected to the backlight unit 120. In this exemplary embodiment, the inverter circuit 150 is disposed outside the case 130. However, the inverter circuit 150 may be disposed inside the backlight unit 120 in alternative exemplary embodiments.

The optical sheet 123 is provided to enhance characteristics of the light emitted from the backlight unit 120. The optical sheet 123 may be a diffusion sheet diffusing the light, or a prism sheet condensing the light. In the backlight unit 120, the number of the CCFLs 122 is preferably more than 10, more preferably 14 or 16. However, the present invention is not limited to the above-described configuration.

Figure 3:
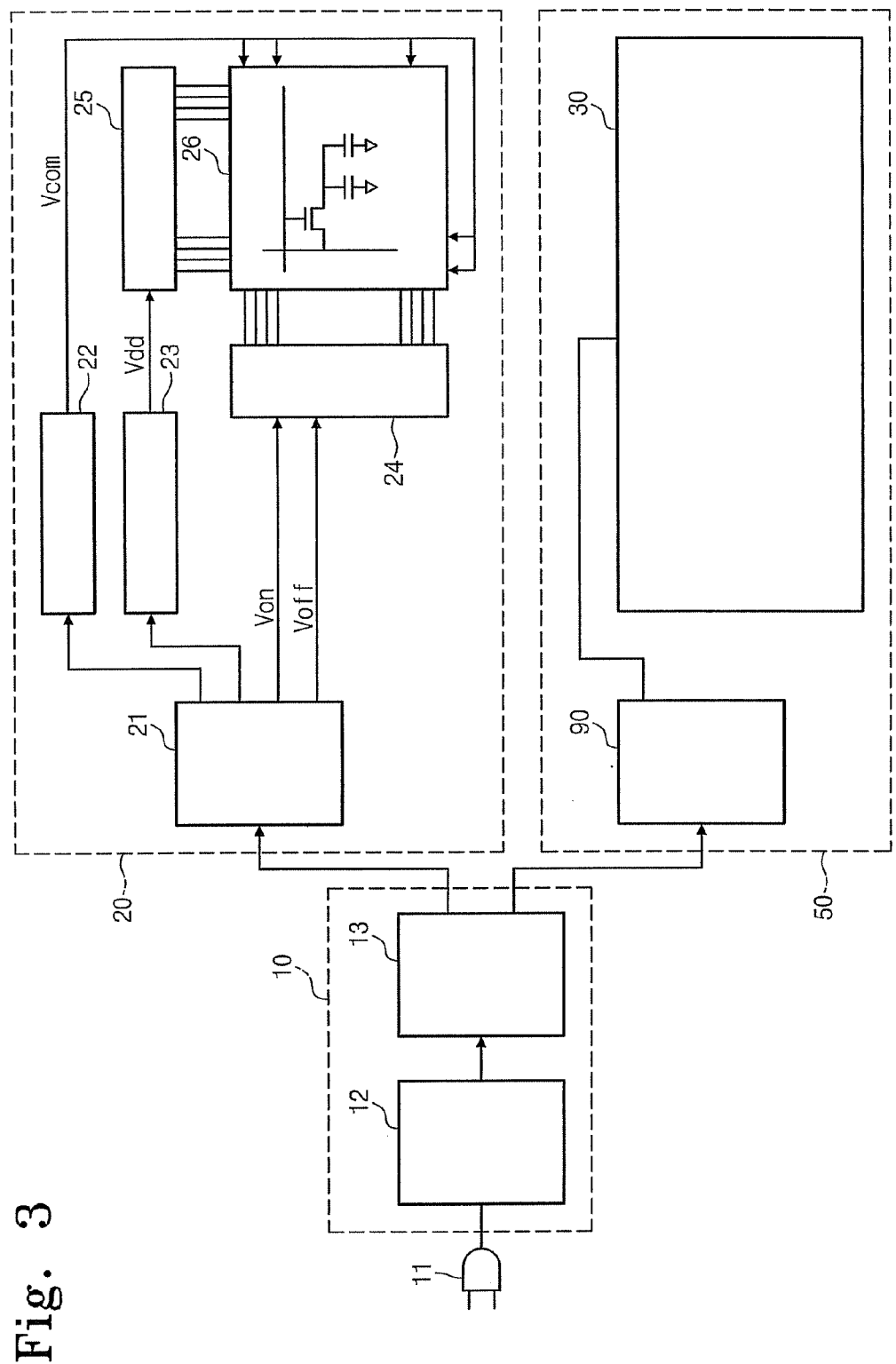
FIG. 3 is a functional block diagram of the LCD of FIG. 1.

FIG. 3 is a functional block diagram of an LCD 100 having an inverter circuit and a backlight according to an exemplary embodiment of the present invention.

Referring to FIG. 3, the LCD 100 includes a power supply 10, a liquid crystal panel driver 20 and a backlight driver 50.

The power supply 10 includes an AC/DC rectifier 12 and a DC/DC converter 13. The AC/DC rectifier 12 is connected to an AC plug 11 through which AC of 110-120 V is supplied. The DC/DC converter 13 supplies predetermined voltages to the liquid crystal panel driver 20 and the backlight driver 50.

The liquid crystal panel driver 20 includes a gate driver 24 that drives gate lines of the liquid crystal display panel 111 (FIG. 1), a data driver 25 that drives data lines, a liquid crystal panel 26 connected to the gate driver 24 and the data driver 25, a common voltage (Vcom) generator 22 and a gamma (γ) voltage generator 23 that generates various voltages to the data driver 25, and a DC/DC converter 21 that supplies DC voltages to the gate driver 24, the Vcom generator 22, and the γ voltage generator 23.

The backlight driver 50 includes a CCFL backlight part 30 having a plurality of CCFLs, and an inverter part 90 that supplies a high-frequency high voltage having an amplitude of about 2 kV to the CCLF backlight part 30. The inverter circuit of the present invention is associated with the inverter part 90. Also, the backlight of the present invention is associated with the backlight driver 50 having the CCFL backlight part 30 and the inverter part 90.

Figure 4:
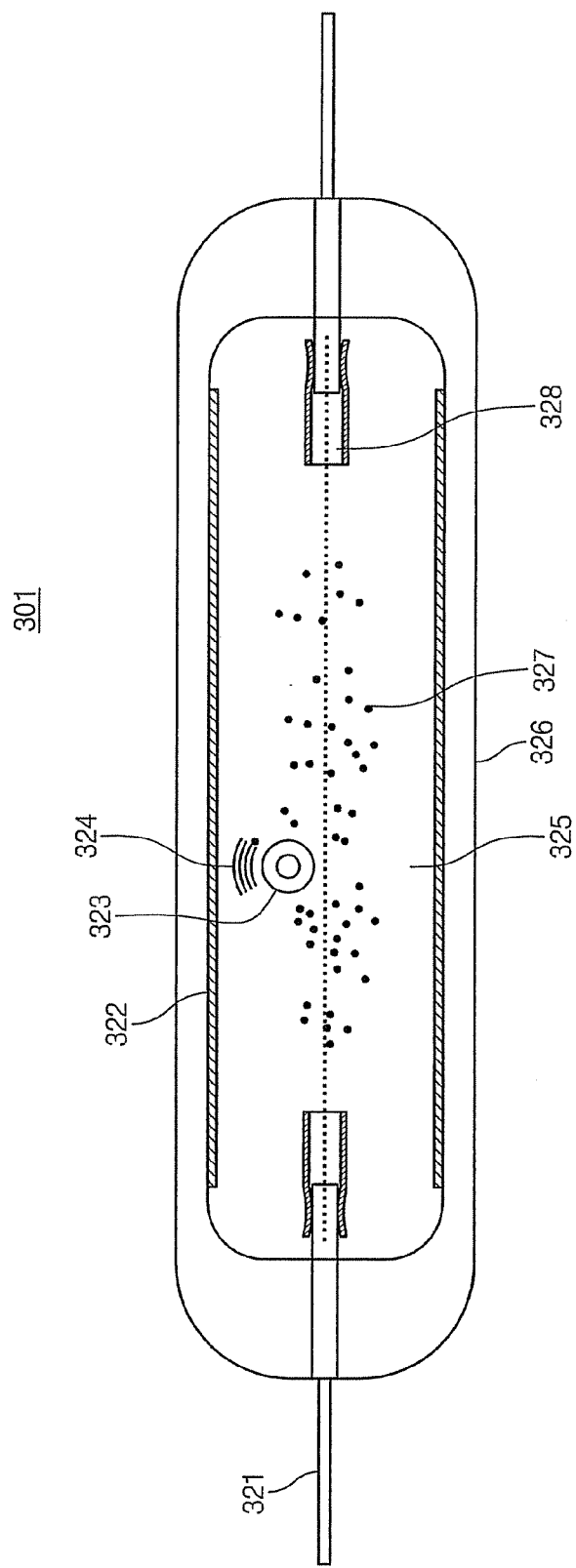
FIG. 4 is a schematic view of a general CCFL.

First, the structure of the CCFL will now be described with reference to FIG. 4. FIG. 4 is a schematic diagram of a general CCFL 301.

Referring to FIG. 4, the CCFL 301 has a glass tube 326 filled with gas 325. Lead lines 321 and electrodes 328 are disposed on both ends of the glass tube 326. Phosphors 322 are coated on an inside of the glass tube 326. The glass tube 326 is filled with mercury 323. When a high-frequency high voltage is applied to the two electrodes 328, electrons pass through the glass tube 326 and mercury is excited by the electrons. The excited mercury emits ultraviolet rays 324. When the ultraviolet rays 324 are irradiated on the phosphors 322, the phosphors 322 emit white light. In this embodiment, the CCFL 301 is used as the CCFLs 122 (FIG. 2) of the backlight driver 50 (FIG. 3).

Figure 5:
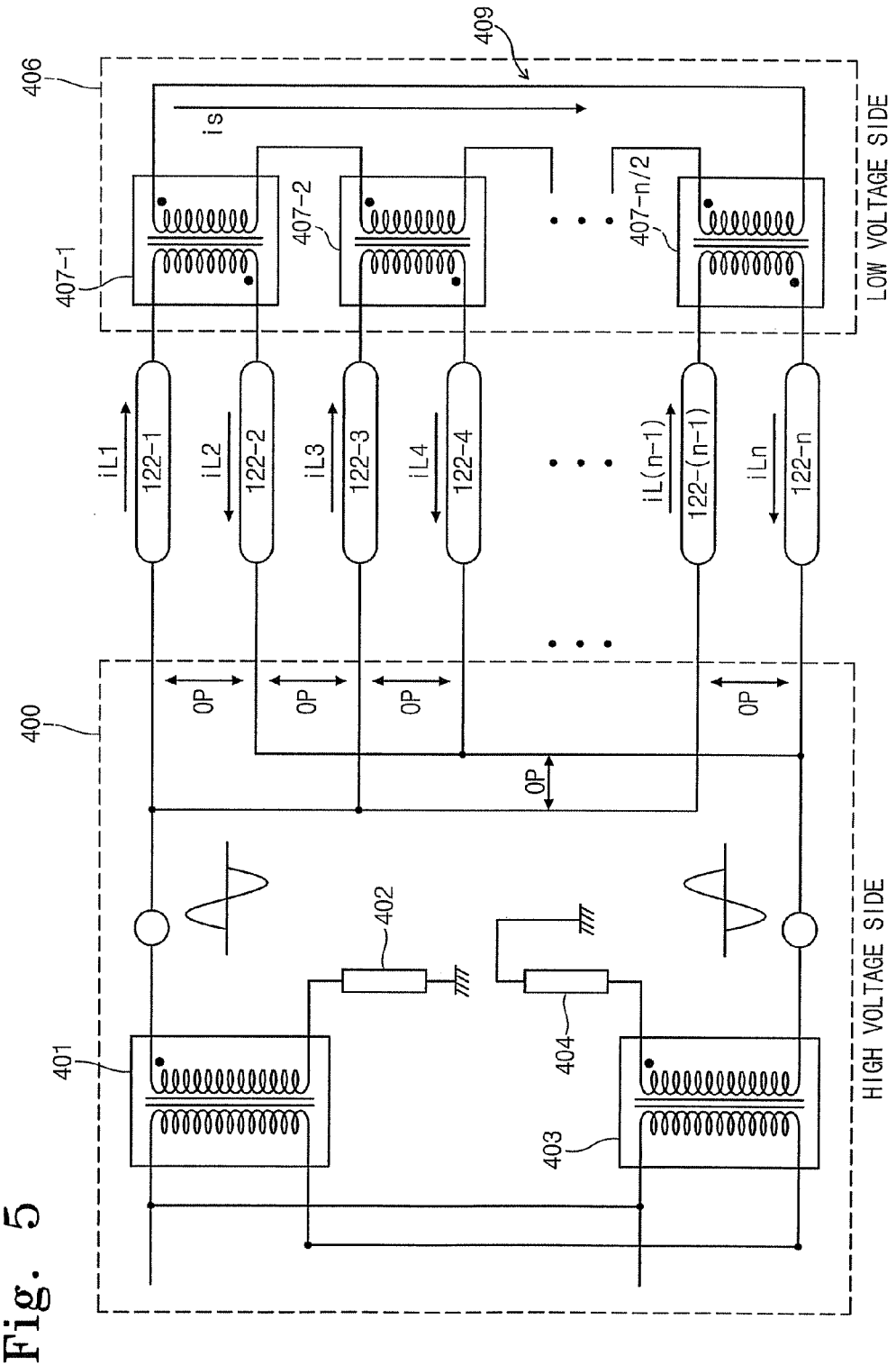
FIG. 5 is a schematic circuit diagram of an inverter circuit and a backlight.

FIG. 5 is a schematic circuit diagram of an inverter circuit and a backlight, attributing to the development of the present invention.

As illustrated in FIG. 5, the inverter circuit has a high voltage circuit 400 and a low voltage circuit 406. The high voltage circuit 400 includes a first inverter transformer 401, a first resistor 402 connected to a secondary side of the first inverter transformer 401, a second inverter transformer 403, and a second resistor 404 connected to a secondary side of the second inverter transformer 403. The low voltage circuit 406 includes a plurality of balance transformers 407-1, 407-2, ..., 407-$n$/2.

Referring to FIG. 5, the backlight includes a plurality of CCFLs 122-1, 122-2, ..., 122-($n$−1) and 122-$n$. In FIG. 5, although it is assumed that n=14 and the number of the CCFLs 122 is 14, the present invention is not limited to this configuration. AC voltages boosted at the secondary sides of the inverter transformers 401 and 403 in the high voltage circuit 400 are applied to the CCFLs 122-1 to 122-$n$. The resistors 402 and 404 are used to detect current flowing through the CCFLs 122-1 to 122-$n$.

In the inverter circuit and the backlight of FIG. 5, high voltages of opposite polarities are applied to the adjacent CCFLs, that is, the CCFLs 122-1 and 122-2, the CCFLs 122-2 and 122-3, ..., the CCFLs 122-($n$−1) and 122-$n$). Thus, a low noise can be achieved by the differential driving of the CCFLs.

The adjacent CCFLs 122-1 and 122-2 are connected in series to the primary side (primary coil) of the balance transformer 407-1 in the low voltage circuit 406. The adjacent CCFLs 122-3 and 122-4 are connected in series to the primary side (primary coil) of the balance transformer 407-2 in the low voltage circuit 406. Likewise, the adjacent CCFLs 122-($n$−1) and 122-$n$ are connected in series to the primary side (primary coil) of the balance transformer 407-$n$/2 in the low voltage circuit 406. That is, the adjacent CCFLs are connected in series to the primary side (primary coil) of a single balance transformer. Also, the secondary sides (secondary coils) of all the balance transformers 407-1, 407-2, ..., 407-$n$/2 are connected in series to form a closed loop 409.

Since the secondary sides (secondary coils) of the balance transformers 407-1, 407-2, ..., 407-$n$/2 form the closed loop 409, the current is flowing through the closed loop 409 commonly flows through the secondary sides (secondary coils) of the balance transformers 407-1, 407-2, ..., 407-$n$/2. Also, the currents iL1, iL2, ..., iLn flowing through the CCFLs 122-1, 122-2, ..., 122-($n$−1) and 122-$n$ connected to the primary sides (primary coils) of the balance transformers 122-1, 122-2, ..., 122-($n$−1) and 122-$n$ maintain their balances.

In the inverter circuit and the backlight of FIG. 5, the number of the balance transformers is equal to half the number of the CCFLs.

As described above, because the phases of the high voltage applied to the adjacent CCFLs are alternately reversed (opposite phase, OP), low noise can be achieved. Meanwhile, because the high voltages of the opposite polarities are applied to the terminals of the adjacent CCFLs connected to the high voltage circuit, it is necessary to secure an insulation distance between the terminals. At this point, cables for the arrangement of these CCFLs may be lengthened and complexed. Also, as the substrate size becomes larger, a manufacturing cost increases. In addition, the lamp lead lines disposed at every two CCFLs are insulated.

The inventors of the present invention have made an effort to improve the above-described structure and have invented the inverter circuit and backlight of the present invention.

Figure 6:
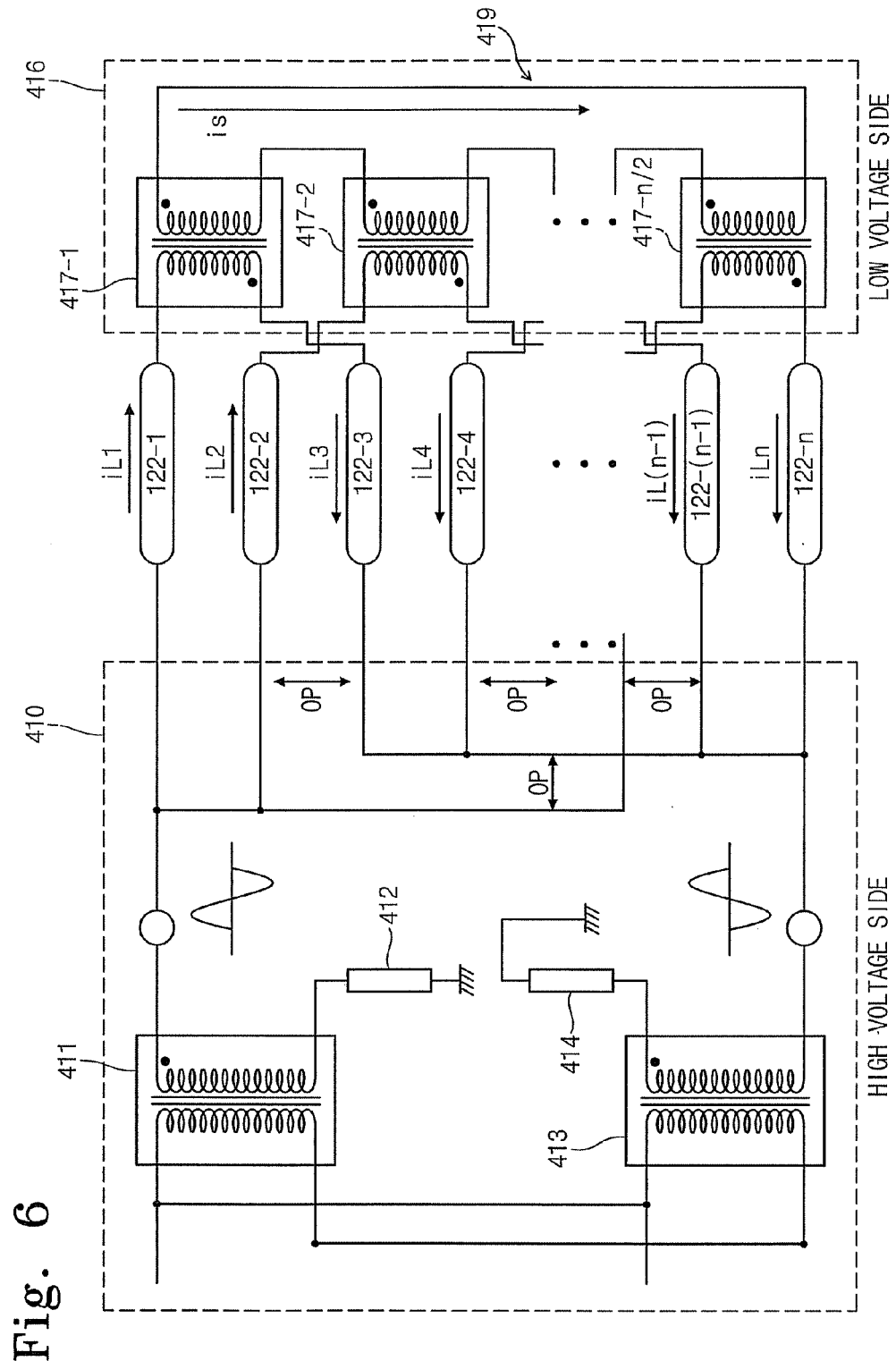
FIG. 6 is a schematic circuit diagram of an inverter circuit and a backlight according to an exemplary embodiment of the present invention.

FIG. 6 is a schematic circuit diagram of an inverter circuit and a backlight according to an exemplary embodiment of the present invention.

Referring to FIG. 6, the inverter circuit of the present invention includes a high voltage circuit 410 and a low voltage circuit 416. The high voltage circuit 410 includes a first inverter transformer 411, a first resistor 412 connected to a secondary side (secondary coil) of the first inverter transformer 411, a second inverter transformer 413, and a second resistor 414 connected to a secondary side (secondary coil) of the second inverter transformer 413. The low voltage circuit 416 includes a plurality of balance transformers 417-1, 417-2, ..., 417-n/2.

The backlight of FIG. 6 includes a plurality of CCFLs 122-1, 122-2, ..., 122-(n−1) and 122-n. In the present exemplary embodiment, although it is assumed that n=14 and the number of the CCFLs 122 is 14, the backlight is not limited to this configuration. There is no problem as long as the number of the CCFLs 122 is an even number. AC voltages boosted at the secondary sides (secondary coils) of the inverter transformers 411 and 413 in the high voltage circuit 410 are applied to the CCFLs 122-1 to 122-n. The resistors 412 and 414 are used to detect current flowing through the CCFLs 122-1 to 122-n.

In FIG. 6, high voltages of same polarities are applied to the adjacent CCFLs (i.e., the CCFLs 122-1 and 122-2, the CCFLs 122-3 and 122-4, ..., the CCFLs 122-(n−1) and 122-n). That is, high voltages of opposite polarities are applied to every two CCFLs. For example, the polarity of the high voltage applied to the CCFLs 122-1 and 122-2 is opposite to that of the high voltage applied to the CCFLs 122-3 and 122-4. The polarity of the CCFLs 122-3 and 122-4 is opposite to that of the high voltage applied to the CCFLs 122-5 and 122-6 (not shown). Likewise, the polarity of the high voltage applied to the CCFLs 122-(n−3) and 122-(n−2) (not shown) is opposite to that of the high voltage applied to the CCFLs 122-(n−1) and 122-n. Therefore, low noise can be achieved.

Also, the adjacent CCFLs 122-1 and 122-3 are connected in series to the primary side (primary coil) of the balance transformer 417-1 in the low voltage circuit 416. The adjacent CCFLs 122-2 and 122-4 are connected in series to the primary side (primary coil) of the balance transformer 417-2 in the low voltage circuit 416. Likewise, the adjacent CCFLs 122-(n−2) and 122-n are connected in series to the primary side (primary coil) of the balance transformer 417-n/2 in the low voltage circuit 416.

That is, the CCFLs are alternately connected in series to the primary side (primary coil) of a single balance transformer. Also, the secondary sides (secondary coils) of all the balance transformers 407-1, 407-2, ..., 407-n/2 are connected in series to form a closed loop 419.

Since the secondary sides (secondary coils) of the balance transformers 407-1, 407-2, ..., 407-n/2 form the closed loop 419, the current is flowing through the closed loop 419 commonly flows through the secondary sides (secondary coils) of the balance transformers 407-1, 407-2, ..., 407-n/2. Also, the currents iL1, iL2, ..., iLn flowing through the CCFLs 122-1, 122-2, ..., 122-(n−1) and 122-n connected to the primary sides (primary coils) of the balance transformers 122-1, 122-2, ..., 122-(n−1) and 122-n maintain their balances.

In the inverter circuit and the backlight of the present invention, the number of the balance transformers is equal to half the number of the CCFLs.

The phases of the high voltages applied to the CCFLs are alternately reversed at every two CCFLs. In other words, the high voltages of the same phase are applied to the two adjacent CCFLs, and it is unnecessary to consider the insulation distance between the two adjacent CCFLs, thereby reducing a line width. Also, although it is necessary to secure the insulation distance at every two CCFLs in the high voltage side, lines corresponding to the arrangement pitch of the CCFLs can be provided by using slits and so on.

Moreover, since the primary sides (primary coils) of the balance transformers 417-1, 417-2, ..., 417-n/2 are at a low voltage, general lines can be used.

In this exemplary embodiment, although the phases of the voltages applied to every two CCFLs are reversed, the present invention is not limited to this configuration. As an example, the phases of the voltages applied to every three or four CCFLs may be reversed. To maximize suppression of an influence of noise occurring in the CCFLs on a displayed image, it is effective to reverse the phases of the CCFLs at as many locations as possible. As illustrated in FIG. 6, the reversing of the phase of the voltage applied to every two CCFLs makes it possible to secure the insulation distance and low noise.

Hereinafter, an inverter circuit and a backlight according to another exemplary embodiment of the present invention will be described with reference to FIG. 7.

Figure 7:
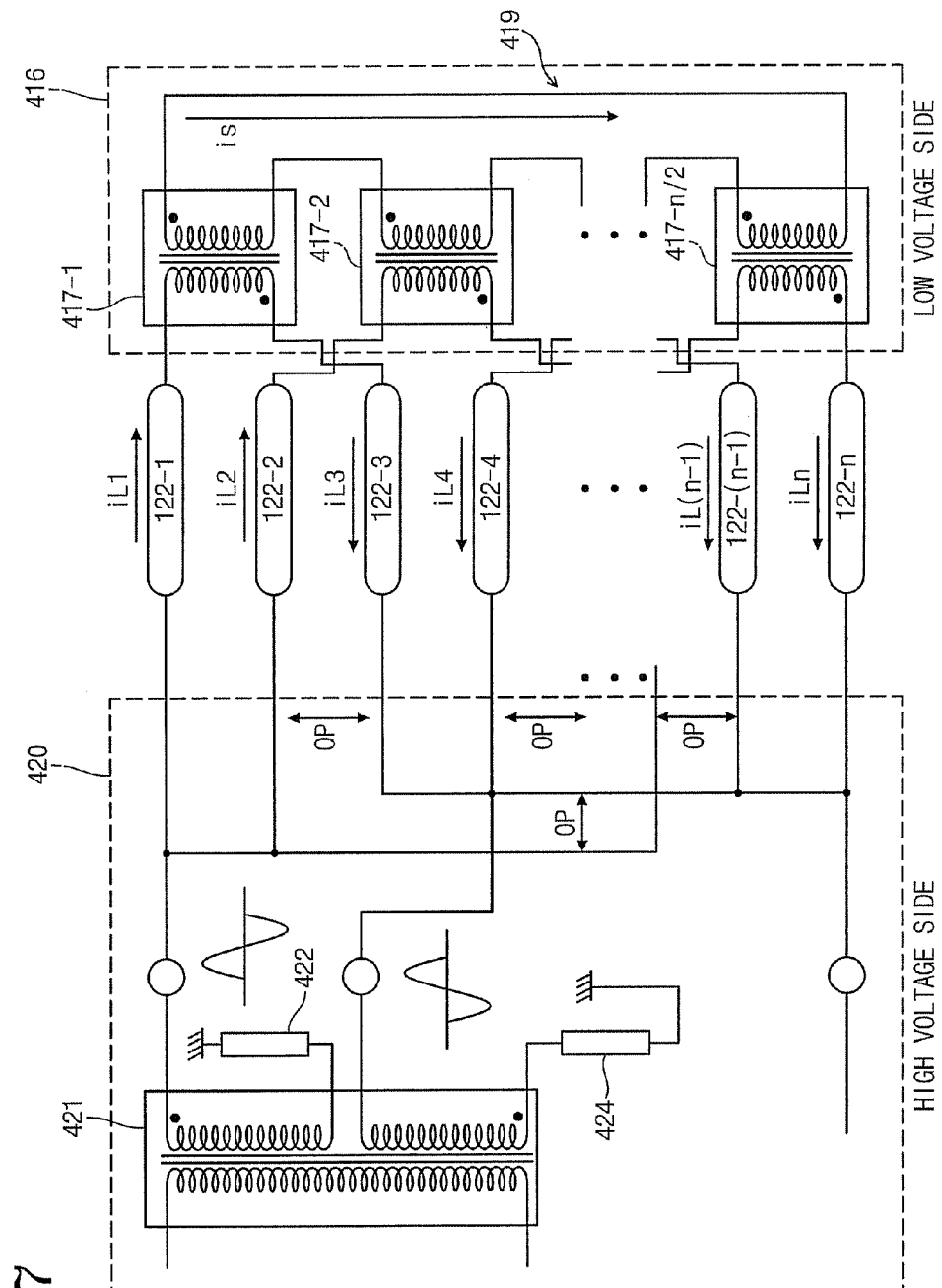
FIG. 7 is a schematic circuit diagram of an inverter circuit and a backlight according to another exemplary embodiment of the present invention.

FIG. 7 is a schematic circuit diagram of an inverter circuit and a backlight according to another exemplary embodiment of the present invention.

The inverter circuit and the backlight of FIG. 7 have a similar structure to the inverter circuit and the backlight of FIG. 6. However, the inverter circuit and the backlight of FIG. 7 have a single inverter transformer 421, while the inverter circuit and the backlight of FIG. 6 have two inverter transformers 411 and 413 and form two resonant circuits. The inverter transformer 421 has a single primary coil and two secondary coils that use the primary coil commonly. The same effect as the aforementioned exemplary embodiment of FIG. 6 can be obtained through this structure. Specifically, because the exemplary embodiment of FIG. 7 can be implemented using the single inverter transformer 421, it attributes to the miniaturization. Further, in this case as well, it is preferable that the number of the balance transformers in each resonant circuit be an even number. Thus, it is preferable that a total number of the CCFLs be an even number.

Hereinafter, a case where a slit is used in every two CCFLs to secure the insulation distance according to the high voltage side in the inverter circuit and the balance transformer of the present invention will be described below.

Figure 8:
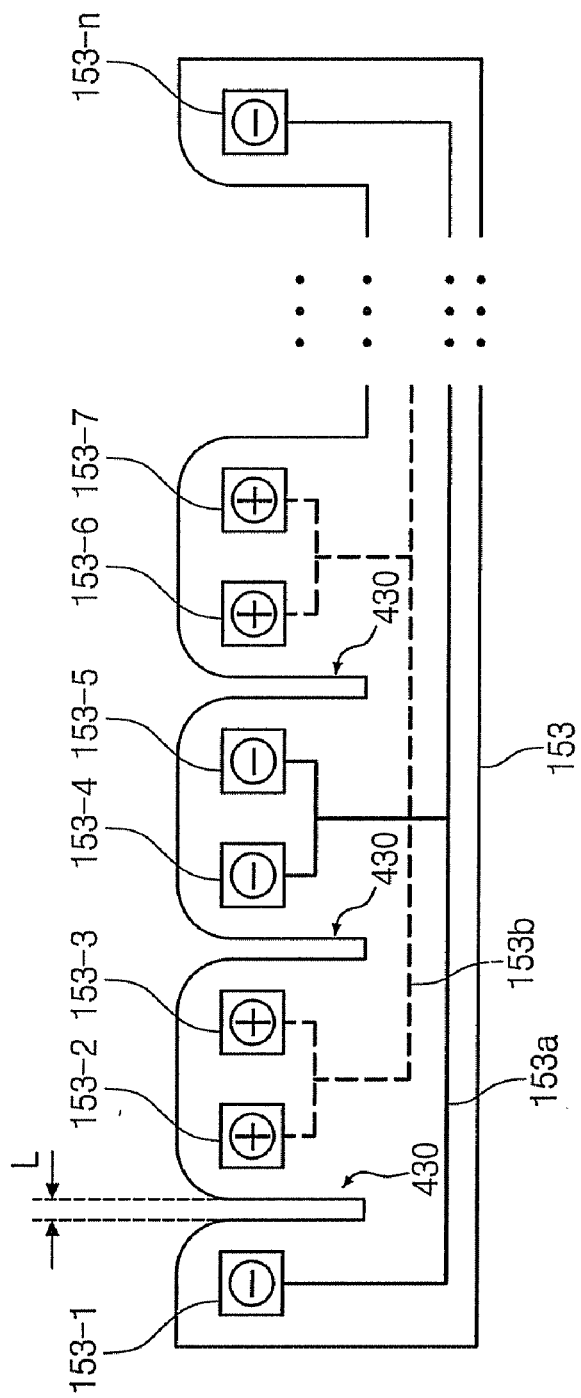
FIG. 8 is a schematic view illustrating a case where a slit is used in an electrode substrate of a high voltage side.
Figure 9:
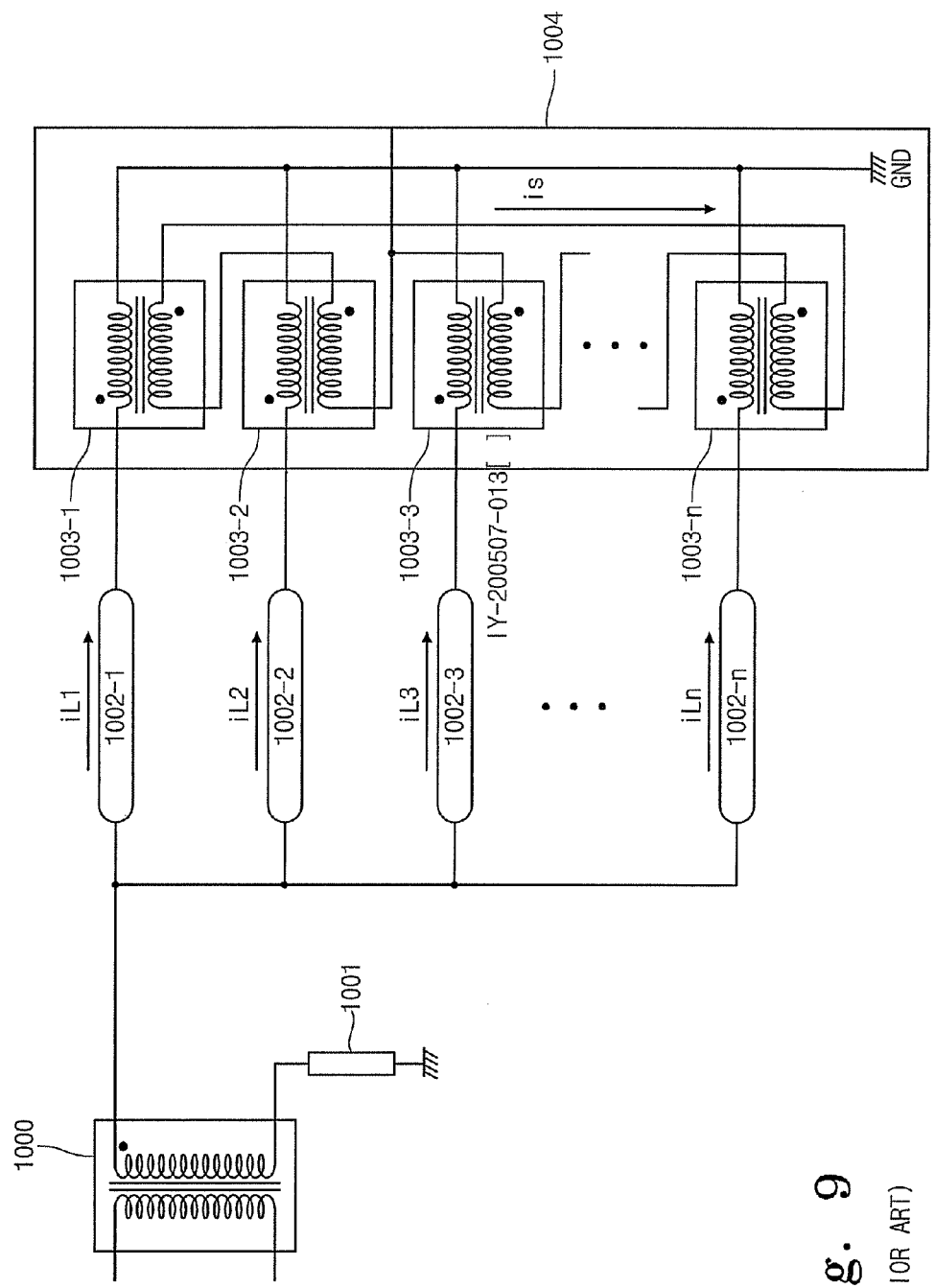
FIG. 9 is a schematic circuit diagram of a conventional inverter circuit.

FIG. 8 is a schematic view illustrating the case where a slit 430 is used in an electrode substrate 153 of a high voltage side at every two CCFLs.

Referring to FIG. 8, connectors 153-1, 153-2, 153-3, 153-4, 153-5, 153-6, 153-7, ..., 153-n connected to respective CCFLs are designed on the electrode substrate 153 of the high voltage side. A negative high voltage is applied to the connectors 153-1, 153-4, 153-5, ..., 153-n and a positive high voltage is applied to the connectors 153-2, 153-3, 153-6, 153-7, ..., 153-(n−1). A reference numeral 153a represents a negative high voltage line formed on a main surface of the electrode substrate 153. A reference numeral 153b represents a positive high voltage line formed on a rear surface of the electrode substrate 153. That is, the positive high voltage line formed on the rear surface of the electrode substrate 153 and the connectors 153-2, 153-3, 153-6, 153-7, ..., 153-(n−1) designed on the main surface of the electrode substrate 153 are connected together through holes designed on the electrode substrate 153. In such a structure, the use of the slit 430 makes it possible to secure the insulation distance in the high voltage side and to provide the lines corresponding to the arrangement pitch of the CCFLs.

According to the present invention, although the number of the CCFLs increases, the number of the balance transformers can be reduced by half the number of the CCFLs, thereby realizing the large-sized backlight.

Also, since the phases of the AC voltages applied to the adjacent CCFLs are alternately reversed at every line, noise can be suppressed. It is unnecessary to consider the insulation distance between the CCFLs in the plurality of lines to which the AC voltages of the same phase are applied. Consequently, compact lines can be provided.

As described above, the inverter circuit and the backlight can be suitably used in the LCDs that are widely used as PC monitors and TV monitors.

It will be apparent to those skilled in the art that various modifications and variations can be made in the present invention. Thus, it is intended that the present invention covers the modifications and variations of the present invention provided they come within the scope of the appended claims and their equivalents.

What is claimed is:

1. An inverter circuit comprising:
    an inverter transformer to supply AC high voltages of opposite phases to one another; and
    a plurality of balance transformers,
    wherein the inverter transformer supplies AC high voltages of same phases to every n number of cold cathode fluorescent lamps (CCFLs), the CCFLs are connected in series to primary windings of the balance transformers to which the AC high voltages of same phases are supplied and secondary windings of the balance transformers are connected in series to form a closed loop,
    wherein the inverter transformer supplies the AC high voltage of the same phases to every two CCFLs.

2. The inverter circuit of claim 1, wherein the balance transformer includes the primary windings connected to every two CCFLs.

3. The inverter circuit of claim 1, wherein the inverter transformer includes two inverter transformers.

4. The inverter circuit of claim 1, wherein the inverter transformer has a single primary winding and two secondary windings, the two secondary windings being arranged to have the AC high voltages of the opposite phase.

5. The inverter circuit of claim 1, wherein terminals supplying the AC high voltages of the opposite phases to every n number of the CCFLs are spaced apart from each other by a slit.

6. The inverter circuit of claim 1, wherein the number of the balance transformers is equal to half the number of the CCFLs.

7. A backlight comprising:
    a plurality of CCFLs;
    an inverter transformer to supply AC high voltages of opposite phases to one another; and
    a plurality of balance transformers,
    wherein the inverter transformer supplies AC high voltages of same phases to every n number of the CCFLs, the CCFLs are connected in series to primary windings of the balance transformers to which the AC high voltages of same phases are supplied, and secondary winding of the balance transformers are connected in series to form a closed loop,
    wherein the inverter transformer supplies the AC high voltage of the same phases to every two CCFLs.

8. The backlight of claim 7, wherein the balance transformer includes the primary windings connected to every two CCFLs.

9. The backlight of claim 7, wherein the inverter transformer includes two inverter transformers.

10. The backlight of claim 7, wherein the inverter transformer has a single primary winding and two secondary windings, the two secondary windings being arranged to have the AC high voltages of opposite phase.

11. The backlight of claim 7, wherein terminals supplying the AC high voltages of the opposite phases to every n number of the CCFLs are spaced apart from each other by a slit.

12. The backlight of claim 7, wherein the number of the balance transformers is equal to half the number of the CCFLs.

13. A liquid crystal display comprising:
    a display unit having a liquid crystal panel, and a data circuit and a gate circuit connected to the liquid crystal panel;
    a backlight having a plurality of CCFLs, an inverter transformer, and a plurality of balance transformers; and
    a case and a top chassis to accommodate the display unit and the backlight,
    wherein the inverter transformer supplies AC high voltages of same phases to every n number of the CCFLs, the CCFLs are connected in series to primary windings of the balance transformers to which the AC high voltages of same phases are supplied, and secondary windings of the balance transformers are connected in series to form a closed loops
    wherein the inverter transformer supplies the AC high voltage of the same phases to every two CCFLs.

14. The liquid crystal display of claim 13, wherein the balance transformer includes the primary windings connected to every two CCFLs.

15. The liquid crystal display of claim 13, wherein the inverter transformer includes two inverter transformers.

16. The liquid crystal display of claim 13, wherein the inverter transformer has a single primary winding and two secondary windings, the two secondary windings being arranged to have AC high voltages of opposite phase.

17. The liquid crystal display of claim 13, wherein terminals supplying the AC high voltages of the opposite phases to every n number of the CCFLs are spaced apart from each other by a slit.

18. The liquid crystal display of claim 13, wherein the liquid crystal display is used as a liquid crystal monitor.

19. The liquid crystal display of claim 13, wherein the liquid crystal display is used in a liquid crystal television.

20. The liquid crystal display of claim 13, wherein the number of the balance transformers is equal to half the number of the CCFLs.

* * * * *